United States Patent
Suzuki et al.

(10) Patent No.: US 6,435,548 B2
(45) Date of Patent: Aug. 20, 2002

(54) AIRBAG DEVICE FOR A FRONT SEAT PASSENGER'S SEAT

(75) Inventors: Kazumasa Suzuki; Masaru Ido; Yasushi Okada; Yuji Kuriyama, all of Aichi-ken (JP)

(73) Assignee: Toyoda Gosei Co., Ltd., Aichi-Ken (JP)

( * ) Notice: Subject to any disclaimer, the term of this patent is extended or adjusted under 35 U.S.C. 154(b) by 0 days.

(21) Appl. No.: 09/771,646

(22) Filed: Jan. 30, 2001

(30) Foreign Application Priority Data

Feb. 3, 2000 (JP) .................................... 2000-026841

(51) Int. Cl.[7] ............................................. B60R 21/20
(52) U.S. Cl. ...................... 280/732; 280/728.2; 280/736
(58) Field of Search .............................. 280/728.2, 732, 280/740, 736

(56) References Cited

U.S. PATENT DOCUMENTS

| | | | | |
|---|---|---|---|---|
| 5,186,492 A | * | 2/1993 | Wright et al. ................ 280/732 |
| 5,433,471 A | * | 7/1995 | Sheperd et al. ........... 280/728.2 |
| 5,462,305 A | * | 10/1995 | Hamada ................... 280/728.2 |
| 5,470,102 A | * | 11/1995 | Smith et al. .............. 280/728.2 |
| 5,533,745 A | * | 7/1996 | Jenkins et al. ............ 280/728.2 |
| 5,556,127 A | * | 9/1996 | Hurford et al. ........... 280/730.2 |
| 5,588,668 A | * | 12/1996 | Emambakhsh et al. .. 280/728.2 |
| 5,588,675 A | * | 12/1996 | Lotspih ...................... 280/732 |
| 5,639,112 A | * | 6/1997 | Philion et al. ........... 280/728.2 |
| 5,732,971 A | * | 3/1998 | Lutz ......................... 280/728.2 |
| 5,839,751 A | * | 11/1998 | Lutz ......................... 280/728.2 |
| 6,056,313 A | * | 5/2000 | Lutz et al. ................ 280/728.2 |

FOREIGN PATENT DOCUMENTS

| DE | 299 21 416 U1 | * | 5/2000 |
|---|---|---|---|
| EP | 0 790 151 A2 | * | 8/1997 |

OTHER PUBLICATIONS

Patent Abstracts of Japan, Oct./2000, re JP 11–268602.

* cited by examiner

Primary Examiner—Lanna Mai
Assistant Examiner—Ruth Ilan

(57) ABSTRACT

An airbag device for a passenger's seat includes an airbag, cylinder type inflator, a casing, and a retainer. The airbag is provided with an opening for inflowing an expansion gas therethrough and is capable of being folded. The inflator is capable of producing and supplying the expansion gas to the opening of the airbag. The casing may receive the folded airbag and the inflator therein. The retainer is adapted to engage a peripheral edge of the opening of the airbag and is mounted to the casing with the peripheral edge of the airbag being disposed and compressed between the retainer and the casing. The retainer includes presser portions, which abut the inflator when mounted to the casing. The casing includes supports, which abut the inflator. The inflator is disposed between the presser portions of the retainer and the supports of the casing, thereby securing the inflator within the casing.

10 Claims, 11 Drawing Sheets

AIRBAG DEVICE FOR A FRONT SEAT PASSENGER'S SEAT

FIELD OF THE INVENTION

The invention relates to an airbag device for protecting a front seat passenger, disposed on an instrument panel in front of the passenger.

BACKGROUND OF THE INVENTION

Conventionally, an airbag device for front seat passengers comprises an airbag, an inflator, and a casing (reference should be made to Japanese Patent Laid-Open No. 268602/1999). The airbag is folded when put in the casing, the inflator supplies expansion gas to the airbag, and the casing receives and holds both the airbag and the inflator.

The airbag is provided with an opening for inflowing gas to inflate and deploy the airbag. A retainer is used for mounting the airbag to the casing. The retainer compresses a peripheral edge of the opening through which the gas will flow and is mounted to a seat on the casing. The retainer is provided with a plurality of bolts that pass through the peripheral edge of the opening for the inflowing gas and the mounting seat of the casing, and are clamped by nuts. As a result, the retainer is mounted to the casing.

Also, the inflator includes a flange at one end thereof and an axially extending male thread portion at the other end. The inflator is mounted to the casing by inserting the inflator into the casing with the male thread portion going through the casing in the forefront from the other side (insertion side) so that the male thread portion projects from one side (the projecting side) of a lower part of the casing. The projecting male thread portion permits a nut to be clamped on the male thread portion on the projecting side surface. This causes the flange of the inflator to abut tightly against an outer surface of the insertion side of the casing. More specifically, the inflator is mounted to the casing in such a manner that the nut and the flange of the inflator interpose therebetween both sides (the projecting side and the insertion side) of the lower portion of the casing.

As described above, with the conventional airbag device for a front seat passenger, it has been necessary to mount the retainer to the casing when the airbag is to be mounted to the casing. Also, when the inflator is to be mounted to the casing, it has been necessary to clamp the nut on the male thread portion of the inflator. Therefore, assembly and installation of conventional airbag devices for passengers, has required extensive assembly and installation effort and utilized a relatively large number of constituent parts.

SUMMARY OF THE INVENTION

It is an object of the invention to solve the above-mentioned problems and to provide a passenger airbag device, which has fewer constituent parts and is easily assembled and installed.

The above-mentioned objective can be attained by an airbag, an inflator, a casing and a retainer that are uniquely held together. The airbag is provided with an opening for admitting expansion gas and is capable of being folded down so as to be positioned within the casing. The inflator has a cylindrical configuration and is capable of supplying the expansion gas to the airbag. The casing accommodates both the folded airbag and the inflator. The retainer compresses a peripheral edge about an opening of the airbag and is mounted to the casing thereby securing the airbag to the casing. Further, the retainer is provided with inflator presser portions, that press against the inflator when the retainer is mounted to the casing. The casing is itself provided with supports at opposite ends thereof, that support the inflator when the inflator is positioned therein. The inflator is securely held at each end thereof by respective inflator presser portions and supports when mounted within the casing.

DETAILED DESCRIPTION OF THE INVENTION

The invention will be described below with respect to embodiments shown in the accompanying drawings. All modifications in constituents of claims or equivalents of the constituents shall be contained within the scope of the claims.

Figure 1:
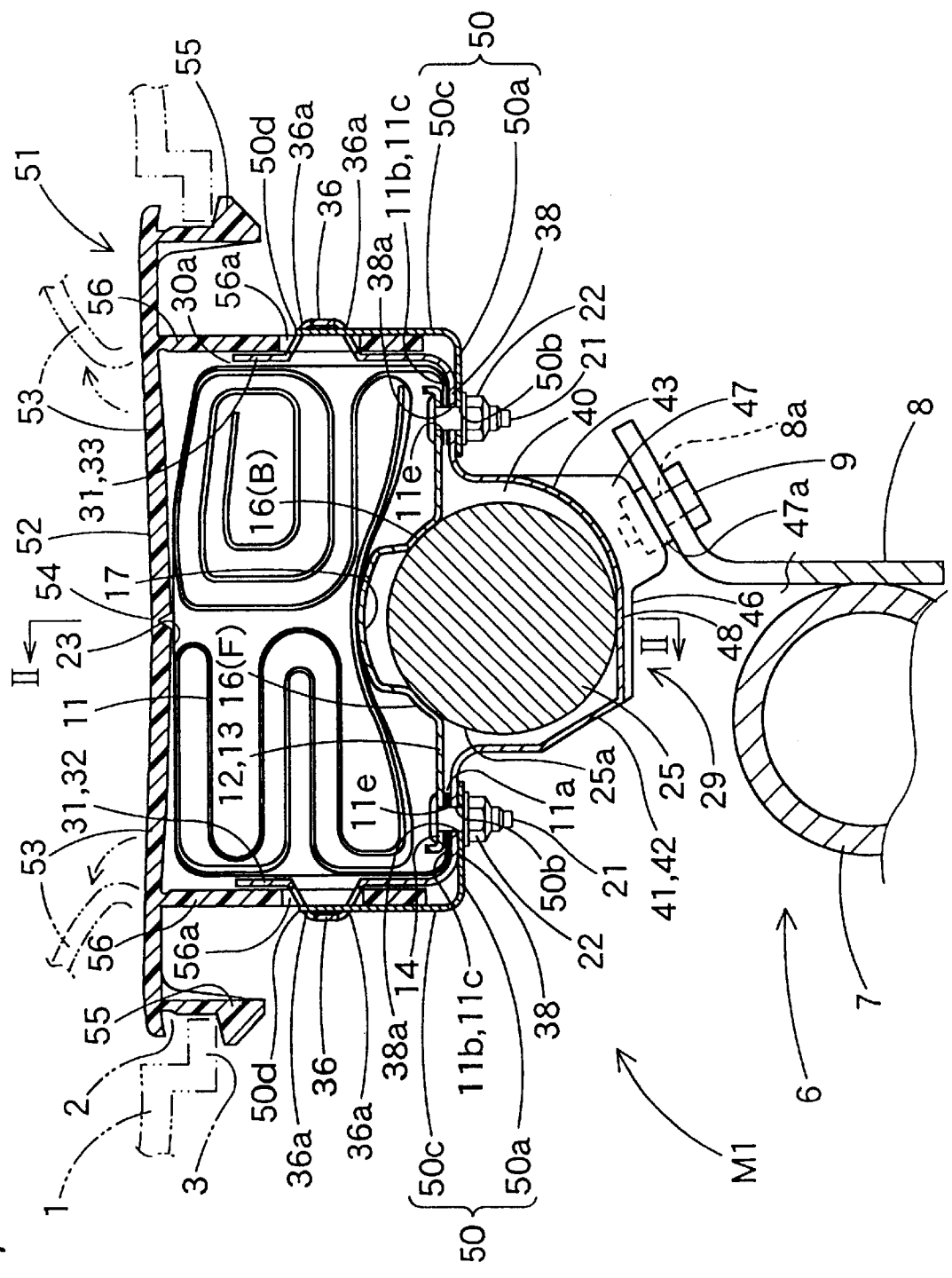
FIG. 1 is a cross sectional view showing a first embodiment of the airbag device of the present invention taken along the line I—I in FIG. 2.
Figure 2:
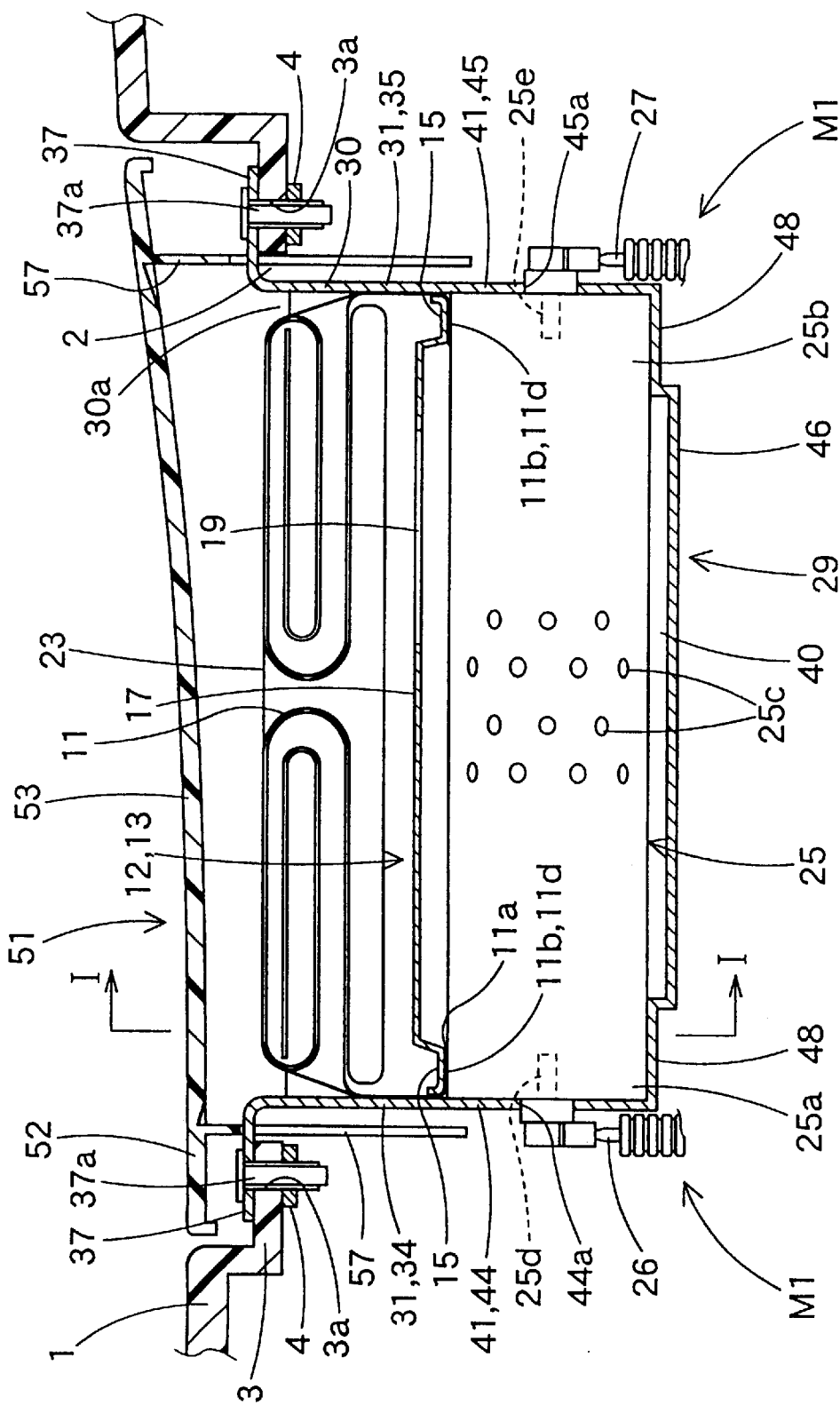
FIG. 2 is a cross sectional of the airbag device shown in FIG. 1 taken along the line II—II in FIG. 1.

A passenger airbag device M1 according to a first embodiment of the present invention is disposed within an instrument panel 1 in front of the front seat passenger, as shown in FIGS. 1 and 2. The airbag device M1 comprises an airbag 11, a cylindrical inflator 25, a casing 29, a retainer 12, a cover body 51, and presser members 50. The airbag 11 is folded to be received in the casing 29. The inflator 25 is capable of producing an expansion gas, which may be used to inflate and thereby deploy the airbag 11. The casing 29 receives and holds the airbag 11 and the inflator 25. The retainer 12 mounts the airbag 11 and the inflator 25 to the casing 29. The airbag cover 51 covers the folded airbag 11 and coordinates with the instrument panel of the vehicle. The presser members 50 connect the cover 51 to the casing 29.

The airbag 11 has a substantially rectangular-shaped opening 11a on a lower portion thereof, for admitting the expansion gas as may be generated by inflator 25.

Figure 3:
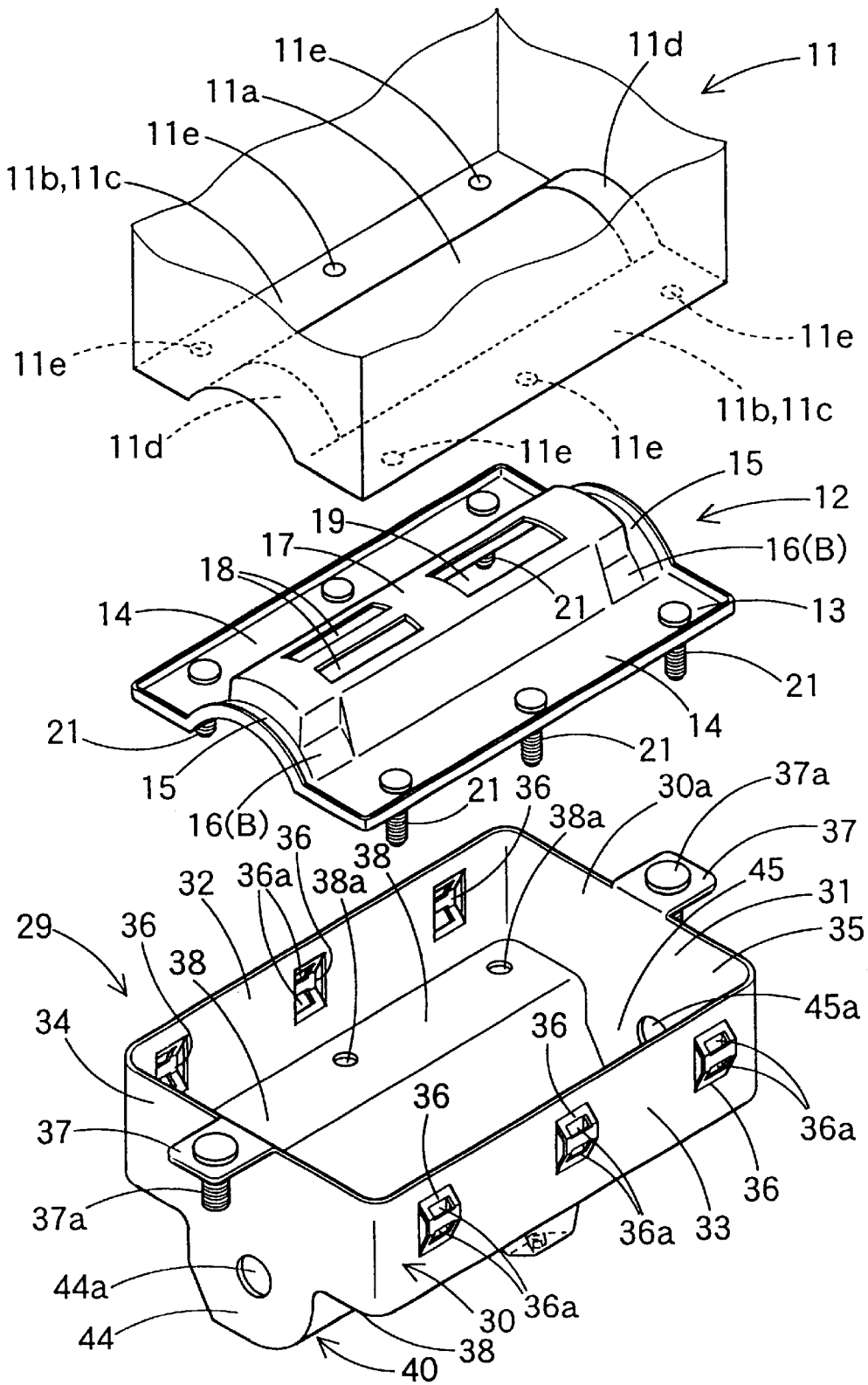
FIG. 3 is an exploded view of the air bag device shown in FIG. 1.

The airbag 11 is preferably formed from cloth of polyester, polyamide or the like. A peripheral edge 11b of the opening 11a is substantially rectangularly shape, as shown in FIG. 3, so as to conform to the outer peripheral edge on the lower surface of the retainer 12. The opening peripheral edge 11b comprises two long sides 11c disposed on both sides relative to a front-rear, or longitudinal, direction of a vehicle, and two short sides 11d disposed on both sides relative to a right-left, or lateral, direction of the vehicle. The long sides 11c, respectively, are formed with a plurality of mount holes 11e for mounting the airbag 11 to the casing 29.

Shown in FIGS. 1–3, the retainer 12 for mounting the airbag 11 to the casing 29 is formed of metallic sheet material, and comprises a rectangularly shaped body portion 13, and bolts 21. Bolts 21 extend from the body portion 13 and are arranged such that each bolt 21 passes through and extends from a respective mount hole 11e.

The body portion 13 comprises airbag presser portions 14, 15 and a cover portion 17. The airbag presser portions 14 are substantially flat members extending longitudinally (relative to the vehicle) forwardly and rearwardly, respectively, from the cover portion 17. The airbag presser portions 15 are semi-circular concavo-convex members (e.g., have semi-cylindrical geometries) extending laterally (relative to the vehicle) from opposite ends of the cover portion 17. As such, inner (upwardly facing) surfaces of the long sides 11c of the airbag 11 are coextended and engaged by the airbag presser portions 14, while inner (upwardly facing) surfaces of the short sides 11d are coextended and engaged by the airbag presser portions 15. When the device M1 is assembled/installed, the long sides 11c are compressed and secured between the presser portions 14 and attachment seats 38 (described in more detail later), while the short sides 11d are compressed and secured between the presser portions 15 and respective partial outer peripheries of the inflator 25.

The cover portion 17 extends generally upwardly from the presser portions 14 and is formed with large and small gas passage holes 18, 19, as shown in FIG. 3. The gas passage holes 18, 19 allow expansion gas discharged from gas discharge ports 25c of the inflator 25 to pass therethrough and enter the airbag 11.

Respective pairs of inflator presser portions 16 (16B, 16F) are arranged to engage respective sides of the inflator 25 (relative to the longitudinal) direction of the vehicle proximate respective ends of the inflator 25. Each of the inflator presser portions 16B, 16F is concavely configured to engage corresponding partial peripheries of the inflator 25 and are spaced circumferentially about the same. Therefore, when the retainer 12 is to be secured to the casing 29 via bolts 21, the respective airbag presser portions 14, 15 compress the opening peripheral edges 11b against the attachment seats 38 and the inflator 25 thereby retaining the opening 11a. Additionally, the presser portions 16 abut directly against respective outer partial peripheries of ends 25a, 25b thereby also retaining the inflator 25.

The inflator 25 is a cylinder-type inflator (having a generally cylindrical shape), and provides, near the center thereof, the gas discharge ports 25c, through which the expansion gas is discharged. Connection holes 25d, 25e are formed each axial end of the inflator 25 (see FIG. 2). Connected to the respective connection holes 25d, 25e are lead wires 26, 27, which permit an electric signal from an airbag device-actuating circuit to be directed to the inflator 25 thereby actuating the same.

The inflator 25 may contain two gas generating devices, which are thereby connected to the airbag device-actuating circuit via respective lead wires 26, 27. However, it is contemplated that the inflator may contain only one gas generating device, thereby needing only a single respective lead wire (either of lead wires 26, 27) operatively extending between the inflator and the airbag device-actuating circuit. It is further contemplated that, in this case, a single through hole (either of 44a and 45a) may accommodate the respective lead wire.

The airbag cover 51 may be formed from a thermoplastic elastomer such as polyolefin-based elastomers, polyester-based elastomers, or the like, and is provided with an upper wall portion 52 and side wall portions 56, 57. The upper wall portion 52 is cooperatively shaped so as to enclose a rectangular-shaped opening within the instrument panel 1. The side wall portions 56, 57 extend downwardly from an underside of the upper wall portion 52 and form a generally box-like configuration.

Two door portions 53 are by the upper wall portion 52. A thin-walled fracture portion 54 is formed between the door portions 53. The fracture portion 54 has a generally H-shaped configuration when viewed from above the upper wall portion 52. When the fracture portion 54 is pushed by the airbag 11, upon inflation of the same, the door portions 53 separate at the fracture portions 54 and outwardly open (out of the instrument panel 1), as shown by two-dot chain lines in FIG. 1.

A plurality of downwardly extending latch portions 55 are formed on edges of the upper wall portion 52 and are adapted to engage an underside of a flange 3. The flange 3 is arranged on a peripheral edge of the opening 2 of the instrument panel 1 and is recessed inwardly (e.g., stepped down) therefrom.

The side wall portions 56 extend downwardly from longitudinal sides of the airbag cover 51, while the side wall portions 57 extend downwardly from lateral sides of the airbag cover 51. The side wall portions 56 are formed with a plurality of latch holes 56a (illustrated as three), which longitudinally extend through the side wall portions 56.

Presser members 50, shown in FIG. 1, are preferably formed from sheet metal, and are L-shaped in cross section providing horizontally extending portions 50a and vertically extending portions 50c. The vertically extending portions 50c extend upwardly from ends of the horizontally extending portions 50a. The presser members 50 are disposed externally of and along the longitudinal sides of the casing 29. The horizontally extending portions 50a are formed with vertically extending through holes 50b, through which respective bolts 21 extend. The vertically extending portions 50c are provided with a plurality of upwardly extending insertion portions 50d. The insertion portions 50d define a comb-like configuration of the vertically extending portions 50c. The respective insertion portions 50d are insertable into respective insertion holes 36a, described later, of the casing 29.

The casing 29 is preferably formed of sheet metal, and defines the upper chamber 30 and the lower chamber 40. The lower chamber 40 is in the form of an upwardly facing downwardly extending recess within the upper chamber 30. As such, the lower chamber 40 partially defines a lower side of the upper chamber 30. The upper chamber 30 is generally rectangularly shaped and is open with respect to its upper side.

The upper chamber 30 is defined by a peripheral wall 31 in the form of a substantially rectangular cylinder with a remainder of the lower side defined by mount seats 38. The peripheral wall 31 is composed of longitudinally-spaced side wall portions 32, 33 and laterally spaced side wall portions 34, 35. A plurality of latch projections 36 extend longitudinally outwardly from respective side wall portions 32, 33.

The respective latch projections 36 are insertable into respective latch holes 56*a* of airbag cover side walls 56. Each latch projection 36 is formed with an insertion hole 36*a*, which extends vertically therethrough. The latch projections 36 are configured to extend outwardly past the outwardly facing surfaces of the side walls 56 when the latch projections 36 are inserted through the respective latch holes 56*a*. The insertion portions 50*d* are then insertable within the insertion holes 36*a* to thereby secure the airbag cover 51 to the casing 29.

Each laterally-spaced side wall portion 34, 35 includes an outwardly extending flange 37 projecting from an upper portion thereof. The flanges 37 are used to connect the casing 29 to the instrument panel 1. A mount bolt 37*a* is fixed to each flange 37 and extends downwardly therefrom. Each bolt 37*a* is inserted through a respective connection hole 3*a* provided within flange portions 3 on a peripheral edge of an instrument panel opening 2. Nuts 4 are threaded onto respective bolts 37*a* thereby securing respective lateral ends of the casing 29 (thus the casing itself) to the instrument panel 1.

The mount seats 38 are formed to extend inwardly from lower ends of the longitudinally-spaced side wall portions 32, 33. Each mount seat 38 is provided with through holes 38*a* to accept respective bolts 21 of the retainer 12. In addition, the horizontally extending portions 50*a* of the presser members 50, respectively, abut against and are disposed on undersides of the mount seats 38, as illustrated in FIG. 1.

The lower chamber 40 is constructed to comprise a peripheral wall 41 and a bottom wall 46. The peripheral wall 41 is in the form of a substantially rectangular recessed cylindrical shape and extends downwardly from inner ends of the mount seats 38. The bottom wall 46 closes a lower end of the peripheral wall 41. The peripheral wall 41 defines longitudinally-spaced side wall portions 42, 43 and laterally-spaced side wall portions 44, 45. Through holes 44*a*, 45*a* are formed on the right and left side wall portions 44, 45 to expose the connection holes 25*d*, 25*e* of the inflator 25.

The bottom wall 46 of the lower chamber 40 is formed with a frame mount 47 for mounting of the casing 25 to a frame 6 of the vehicle. The frame mount 47 is recessed downwardly from the bottom wall 46 and has a rectangular truncated pyramidal configuration. A mount nut 47*a* is securely affixed to a lower portion of the frame mount 47. The frame mount 47 is mounted on a bracket 8 extending from a tubular support, or ring hose 7, that itself is connected to the vehicle's frame. More specifically, the frame mount 47 is mounted on the bracket 8 by threading the bolt 9 into the nut 47*a* through a connection hole 8*a* provided in the bracket 8.

Formed on opposite lateral (relative to the vehicle) ends of the bottom wall 46 are supports 48 for vertically supporting a lower portion of the inflator 25 thereon. The respective supports 48 abut the lower portions of the outer peripheral surfaces of each end 25*a*, 25*b* of the inflator 25.

An explanation will be given to assembly of the airbag device M1 for an assistant driver's seat, according to the first embodiment.

The retainer 12 is arranged inside the airbag 11 such that the bolts 21 extend through the respective mount holes 11*a*. The airbag 11 may then be folded down and wrapped within a tearable wrapping sheet 23 (see FIGS. 1 and 2) to retain the folded arrangement of the airbag 11.

Prior to placement of the retainer 12 within the casing 29, inflator 25 is positioned in the lower chamber 40, such that the connection holes 25*d*, 25*e* align with corresponding through holes 44*a*, 44*b* and each end 25*a*, 25*b* of the inflator 25 is positioned on respective supports 48. The folded airbag 11 is then moved into the respective position within the upper chamber 30 through an opening 30*a* within an upper portion of the upper chamber 30 so that the bolts 21 of the retainer 12 extend through the through holes 38*a* of the respective mount seats 38. The airbag cover 51 is then positioned over the casing 29 and moved relatively vertically thereover, such that the side wall portions 56, 57 engage respective outwardly facing surfaces of the peripheral wall 31. Each latch projection 36 is then made to engage within associated latch holes 56*a* of side wall portions 56, 57. Each presser member 50 is then positioned such that bolts 21 extend through respective openings therein and such that each insertion portion 50 extends through associated insertion holes 36*a* of respective latch projections 36. Each nut 22 is then threadedly engaged with an associated bolt 21 to thereby secure the components to each other.

The respective airbag presser portions 14 of the retainer 12 compress respective long sides 11*c* of the airbag opening peripheral edge 11*b* against the upper surfaces of the respective mount seats 38 of the casing 29. Simultaneously, the respective airbag presser portions 15 of the retainer 12 compress the respective short sides 11*d* of the airbag opening peripheral edge 11*b* to the outer peripheral surface of the inflator 25, thereby securing the airbag 11 to the casing 29.

The respective presser portions 16B, 16F of the retainer 12 abut respective upper partial peripheries of each end 25*a*, 25*b* of the inflator 25. Each end 25*a*, 25*b* of the inflator 25 is thereby supported at three circumferentially-spaced locations via respective presser portions 16B, 16F and the casing support 48. Thus, the inflator 25 is securely in the lower chamber 40.

The respective latch portions 55 are then inserted within the opening 2 of the instrument panel 1 and are thereby latched to the flange 3. Each bolt 37*a* is inserted into the respective connection hole 3*a* and an associated nut 4 is threadedly engaged on each bolt to secure the airbag device M1 to the instrument panel 1. Further, the bolt 9 is inserted through a connection hole 8*a* of the bracket 8 is threadedly engaged with the nut 47*a*, thus connecting the frame mount 47 to the frame 6.

After installing the airbag device M1 within the vehicle, the inflator 25 is connected and thereby made actuable by the airbag device-actuating circuit. Upon actuation of the inflator 25, the expansion gas is discharged from the gas discharge ports 25*c* effectively inflating and deploying the airbag 11. Consequently, the airbag 11 breaches the wrapping sheet 23 and breaks the fracture portion 54 of the airbag cover 51 to open the door portions 53 and expands outwardly (from the instrument panel 1), as shown by the two-dot chain lines in FIG. 1.

As described above, the casing 29 and retainer 12 cooperate to securely support the inflator 25 therebetween. Each axial end of the inflator 25 is supported by the respective presser portions 16B, 16F, provided by the retainer 12, and the respective support 48, provided by the casing 29. The presser portions 16B, 16F and support 48 provide circumferentially spaced support points, which thereby provide support for the inflator 25 in the longitudinal (relative to the vehicle) and vertical (relative to the vehicle) directions. Axial retainment of the inflator 25 is provided by the respective laterally-spaced side wall portions 44, 45. As such, the inflator 25 is securely held between the retainer 12 and the casing 29 without utilizing bolts of other such fasteners. This unique arrangement reduces the effort required in installation and for repair of the airbag device M1. Further, this arrangement cost-effectively reduces constituent parts utilized and the overall weight of the device M1.

In the first embodiment, respective presser portions 16B, 16F and supports 48 are arranged in an axially spaced configuration (relative to the inflator 25) so as to provide sufficient support to the inflator, while not interfering with the expansion gas outflow from the gas discharge parts 25c.

As shown in FIG. 1, each of the presser portions 16B engage partial peripheries of respective axial ends of the inflator 25. The corresponding partial peripheries are disposed on a generally rearwardly-upwardly (relative to the vehicle) facing portion of the outer periphery of the inflator 25. Conversely, each of the presser portions 16F engage partial peripheries of the ends of the inflator 25 that are disposed on a generally forwardly-upwardly facing portion of the outer periphery of the inflator 25. Further, each support 48 engages a partial periphery (or point) of the respective end that is disposed on a generally downwardly facing portion of the outer periphery of the inflator 25. The inflator presser portions 16B, 16F and the supports 48 are disposed in circumferentially-spaced positions where the respective outer peripheral surfaces of each end 25a, 25b is substantially divided into three circumferential sections. Therefore, the inflator presser portions 16B, 16F and the supports 48, respectively, precisely abut the inflator 25. As such, forces applied to the retainer 12 (via the bolts 21) acting on the inflator 25 is distributed equally between the corresponding presser portions 16B, 16F, and support 48 (i.e., the three points circumferentially-spaced about each axial end of the inflator 25). In other words, as load on one of the support points (16B, 16F, 48) at either end of the inflator 25 is inherently shared (distributed) with the other supports at that end, abnormal vibration and/or noise is abated.

The inflator 25 is configured to be removable with respect to the lower chamber 40 of the casing 29 from above (i.e., the opening 30a). As such, the inflator 25 can be removed from the vehicle without interfering with parts within the instrument panel 1 (such as air ducts, a CD changer, and so on) laterally adjacent the casing 29. Therefore, removal of the inflator 25 may be accomplished relatively simply. More specifically, when the inflator 25 is to be removed, the respective nuts 22 are disengaged and the presser members 50 are removed. The cover body 51 may then be removed from the opening 2 of the instrument panel. Then the airbag 11, together with the retainer 12, is removed from the casing 29. The lead wires 26, 27 are removed from the inflator 25, which may then be vertically moved out of the casing opening 30a and the opening 2 of the instrument panel without interfering with parts adjacent the casing 29.

Figure 4:
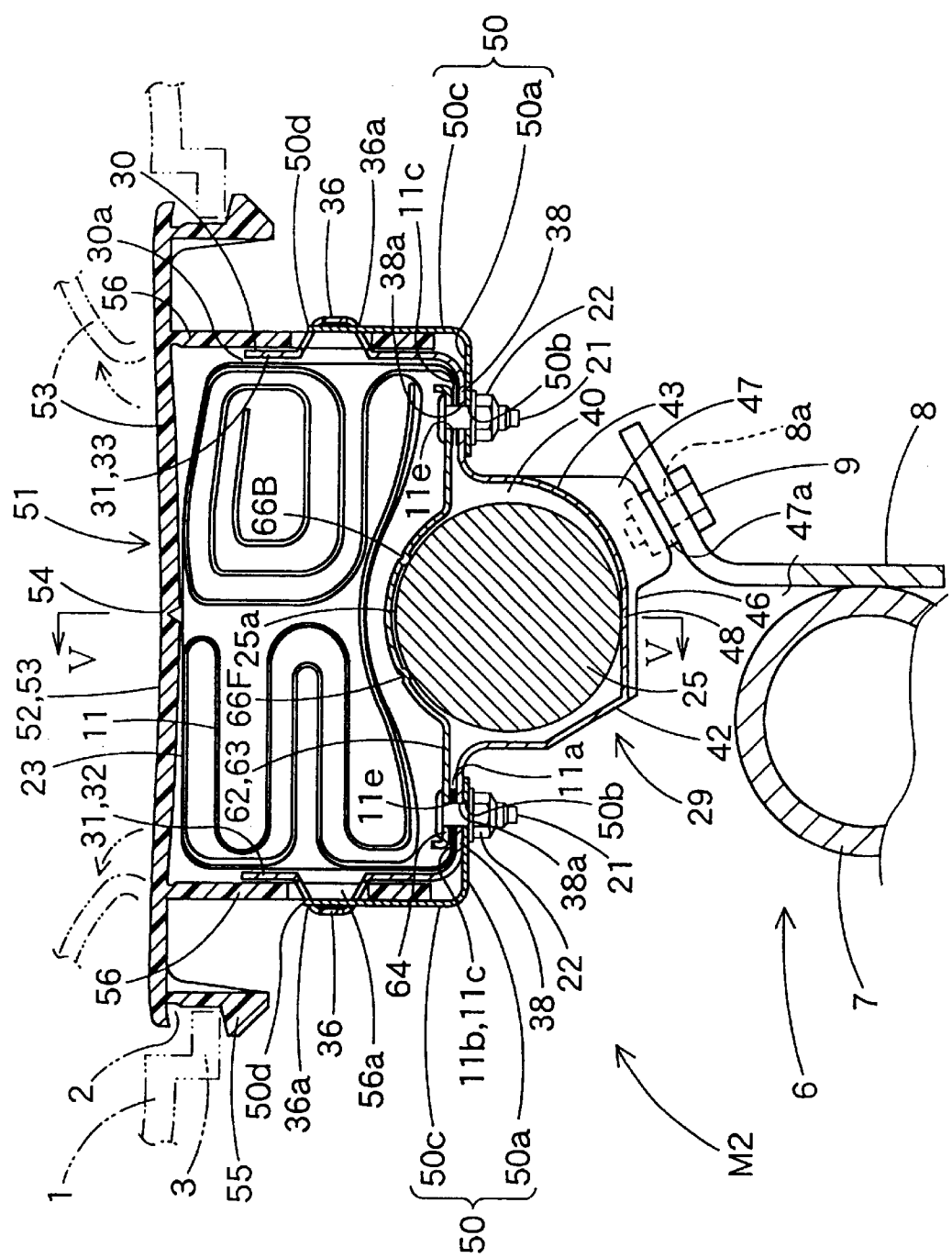
FIG. 4 is a cross sectional view showing a second embodiment of the airbag device of the present invention taken along the line IV—IV in FIG. 5.
Figure 5:
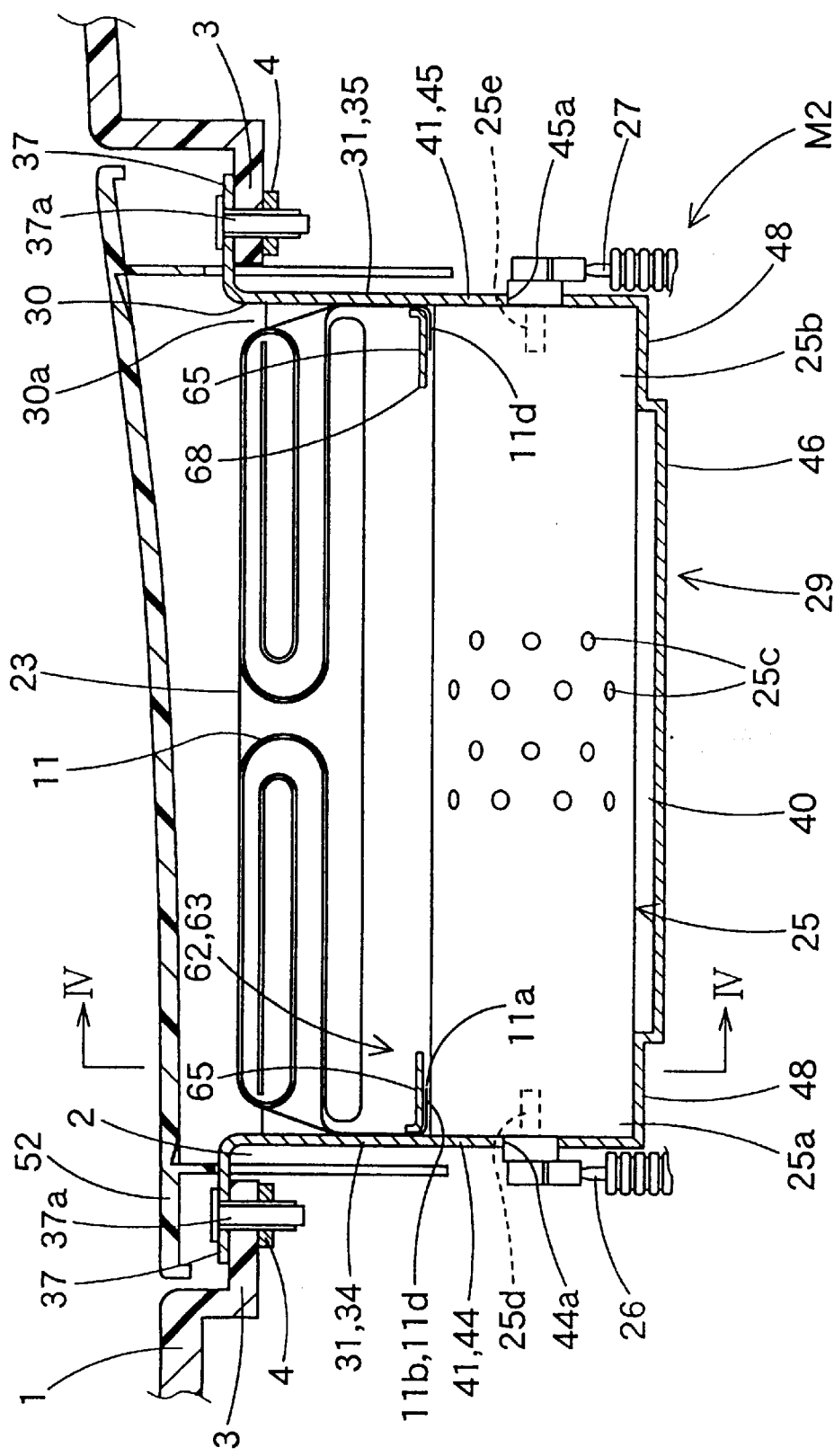
FIG. 5 is a cross sectional view showing the airbag device shown in FIG. 4 taken along the line V—V in FIG. 4.
Figure 6:
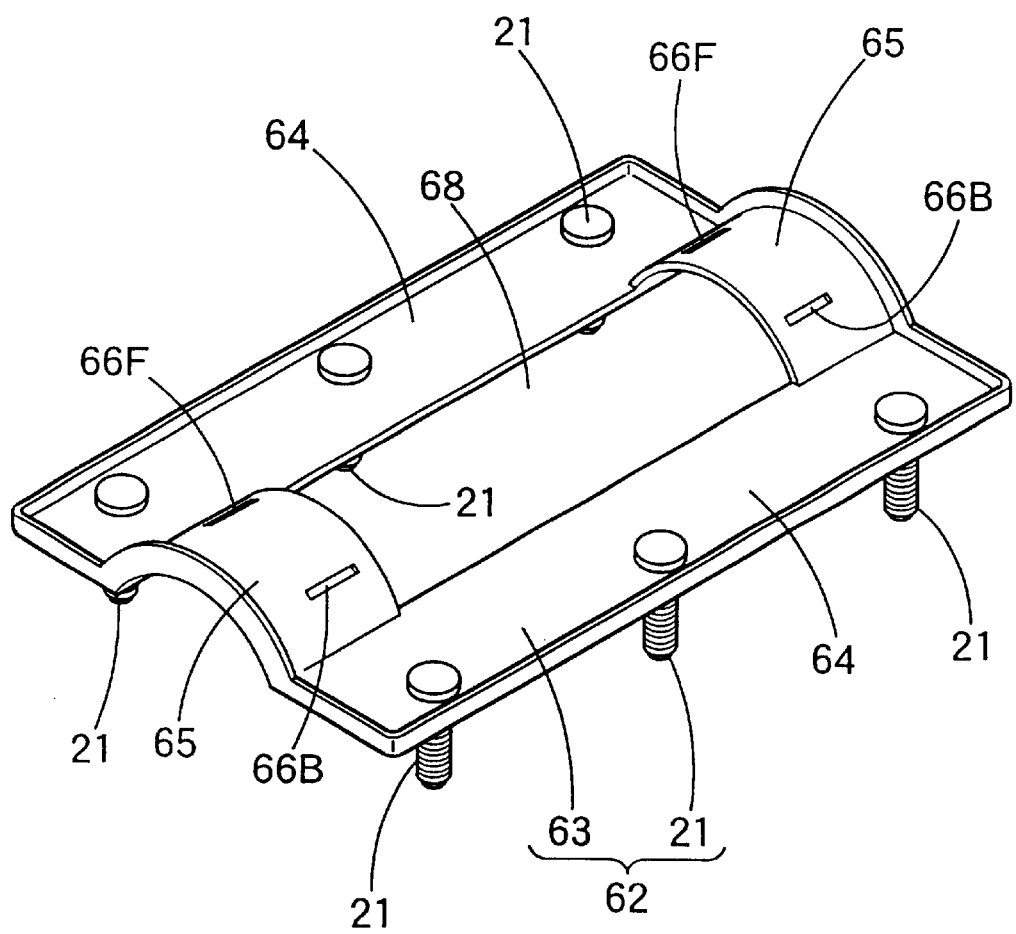
FIG. 6 is a perspective view showing a retainer of the second embodiment.

In a second embodiment of the present invention, illustrated in FIGS. 4–6 at M2, a retainer 62 is utilized that is somewhat different from the retainer 12 of the first embodiment. However, other components, such as the airbag 11, inflator 25, casing 29, cover body 51 and so on, are similar to those of the first embodiment. Therefore, similar parts of the embodiments described herein are represented by the same characters, and detailed explanation thereof is omitted.

Shown in FIG. 6, the retainer 62 of the second embodiment is preferably formed of sheet metal, and comprises a substantially rectangular body portion 63. The plurality of bolts 21 are affixed to airbag presser portions 64 of the body portion 63 and extend downwardly therethrough. Airbag presser portions 64 are similar to the airbag presser portions 14, described previously herein. As shown in FIG. 6, the airbag presser portions 14 are flat members that are elongated in the lateral direction. Also shown, airbag presser portions 65 are disposed at lateral ends (relative to the vehicle) of the presser portions 64 and protrude generally upwardly in a concavo-convex configuration, essentially forming a partial cylindrical member. The retainer 62 further includes a gas communication hole 68 for passage of expansion gas therethrough. The gas communication hole 68 is defined by inner peripheral edges of the presser portions 64, 65.

Similarly to the presser portions 14 of the first embodiment, each airbag presser portion 64 compresses the respective long side 11c of the airbag opening edge 11b against the attachment seats 38. Further, like the airbag presser portions 15 of the first embodiment, each airbag presser portion 65 compresses the respective short side lid of the airbag opening edge 11b against an outer peripheral surface of the inflator 25.

The inflator presser portions 66B, 66F protrude generally downwardly from a concave surface of the airbag presser portions 65, defined by the concavo-convex configuration thereof. The inflator presser portions 66B, 66F may be press worked (such as with a punch) into the respective presser portions 65 so as to protrude downwardly therefrom. The inflator presser portions 66B, 66F are axially (relative to the inflator 25) located (i.e., spaced from an outer edge of the retainer 62) inwardly from the innermost edge of the short sides 11d of the airbag opening edge 11b so as to engage the inflator 2 without significantly contacting the short sides 11d. Each inflator presser portion 66B, 66F is formed to protrude (extend) generally downwardly from the associated airbag presser portion 65. As such, the airbag presser portions 64 compress the opening edges 11b (long sides 11c thereof) against the attachment seats 38 and the presser portions 65 compress the opening edges 11b (short sides lid thereof) against the peripheral surface of the inflator 25. It is preferable of the presser portions 66B, 66F to protrude from the presser portions 65 sufficiently to engage the peripheral surface of the inflator 25. As such, the presser portions 66B, 66F may be formed to protrude from the presser portions 65 a distance at least equal to a thickness of the short sides 11d of the airbag 11. In this manner, the inflator 25 is securely engaged by the presser portions 66B, 66F, while the airbag 11 is securely retained by the presser portions 64, 65.

It is noted that assembly and operation of the various embodiments of the present invention are similar to that of the airbag device M1, as described above. As such, certain similar detailed descriptions of operation and assembly for the various embodiments described herein are omitted.

The retainer 62 is arranged inside the airbag 11 such that the bolts 21 extend through the respective mount holes 11e. The airbag 11 may be folded down at this time and wrapped by the tearable wrapping sheet 23 so as to retain the airbag 11 in the folded configuration.

Prior to positioning the retainer 62 and airbag 11 within the casing 29, the inflator 25 is positioned within the lower chamber 40 so that the connection holes 25d, 25e are aligned with the corresponding through holes 44a, 44b and the lower portion of each end 25a, 25b of the inflator 25 engages the corresponding support 48.

The folded airbag 11 and retainer 62 may then be moved into the upper chamber 30 through opening 30a and situated such that bolts 21 extend through the through holes 38a of the respective mount seats 38. The airbag cover 51 may then be secured to the casing 29 and the airbag device M1 secured to the vehicle, as described above for the first embodiment.

As shown in FIGS. 4–6, the inflator 25 is securely retained with the lower chamber 40 between the retainer 62 and the casing 29, without the use of bolts or other such fastening devices. Therefore, as with the airbag device M1 of the first embodiment, the airbag device M2 comprises fewer constituent parts, is easier to install/remove, has an overall reduced weight, and is more cost-effective as compared with previous airbag devices in the art.

As with the airbag device M1, the device M2 provides support for the inflator 25 at opposite axial ends thereof. As such, the inflator may be stably held between the retainer 62 and the casing 29 without negatively affecting operation thereof (dispersal or inflow of expansion gas to airbag 11).

As shown in FIG. 4, each axial end of the inflator 25 is held at three circumferentially-spaced points about the outer periphery thereof. More specifically, the retainer 62 provides the presser portions 66B, 66F, which engage respective partial peripheries corresponding to an upwardly-rearwardly facing portion and an upwardly-forwardly facing portion of the outer periphery of each end of the inflator 25. The support 48 engages a partial periphery of the respective end corresponding to a lower portion thereof. As such, the inflator 25 is stably held in the vertical and longitudinal directions (relative to the vehicle) by the respective presser portions 66B, 66F and supports 48. The inflator 25 is axially retained via the laterally-spaced side wall portions 44, 45. Consequently, the inflator 25 is omnidirectionally supported.

Further, the arrangement of the three circumferentially-spaced support points (66B, 66F, 48) ensures that a load affected on any of the support points is inherently distributed to and shared by the other support points, effectively abating abnormal vibration of the inflator within the casing 29, which may cause vibratory noise.

Further, by utilizing presser portions 66B, 66F, which have substantially less breadth than the presser portions 16B, 16F of the first embodiment, the presser portions 66B, 66F may more precisely engage the inflator 25 about its periphery, thus increasing the load distribution between the support points (66B, 66F, 48).

Figure 7:
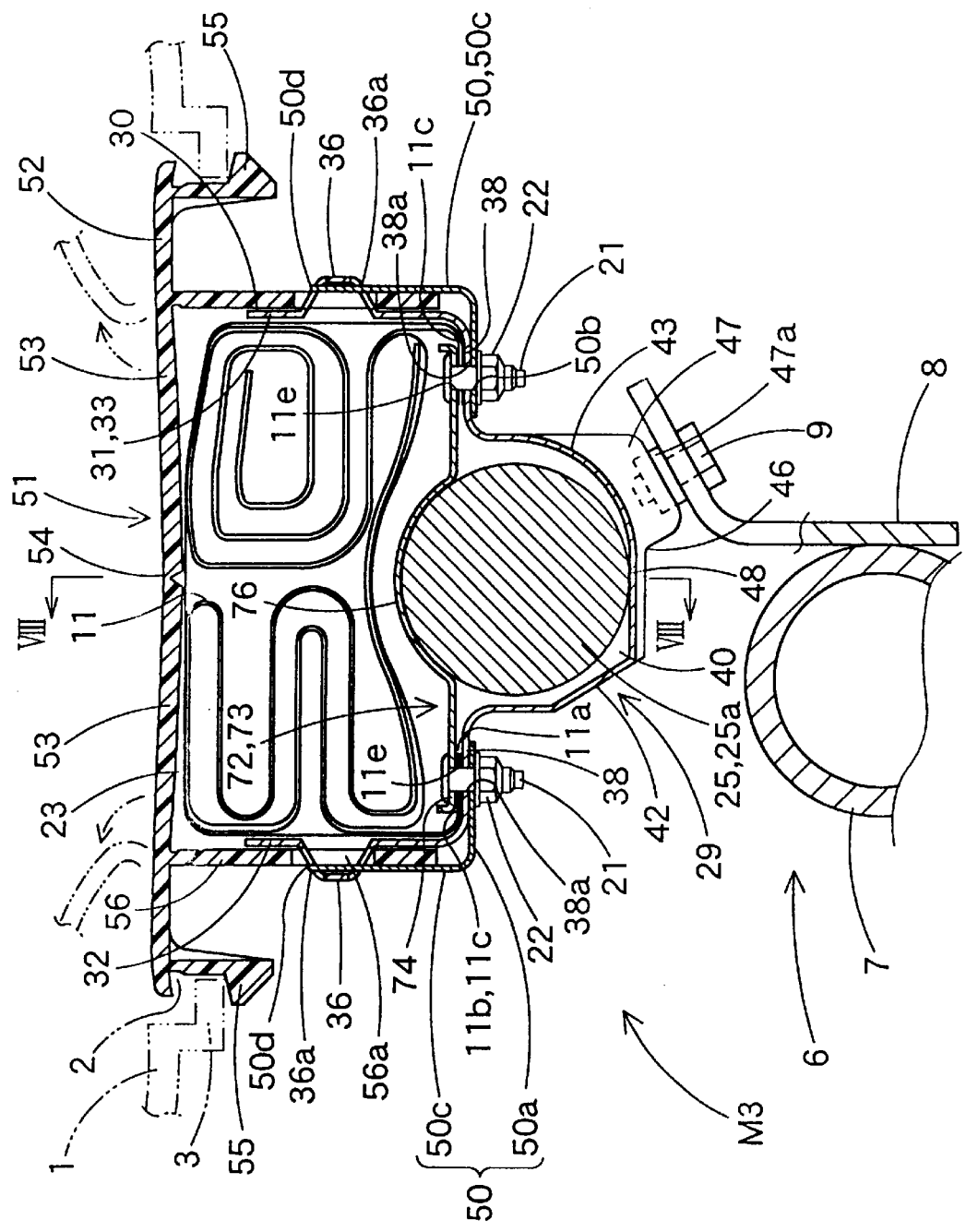
FIG. 7 is a cross sectional view showing a third embodiment of the airbag device of the present invention taken along the line VII—VII in FIG. 8.
Figure 8:
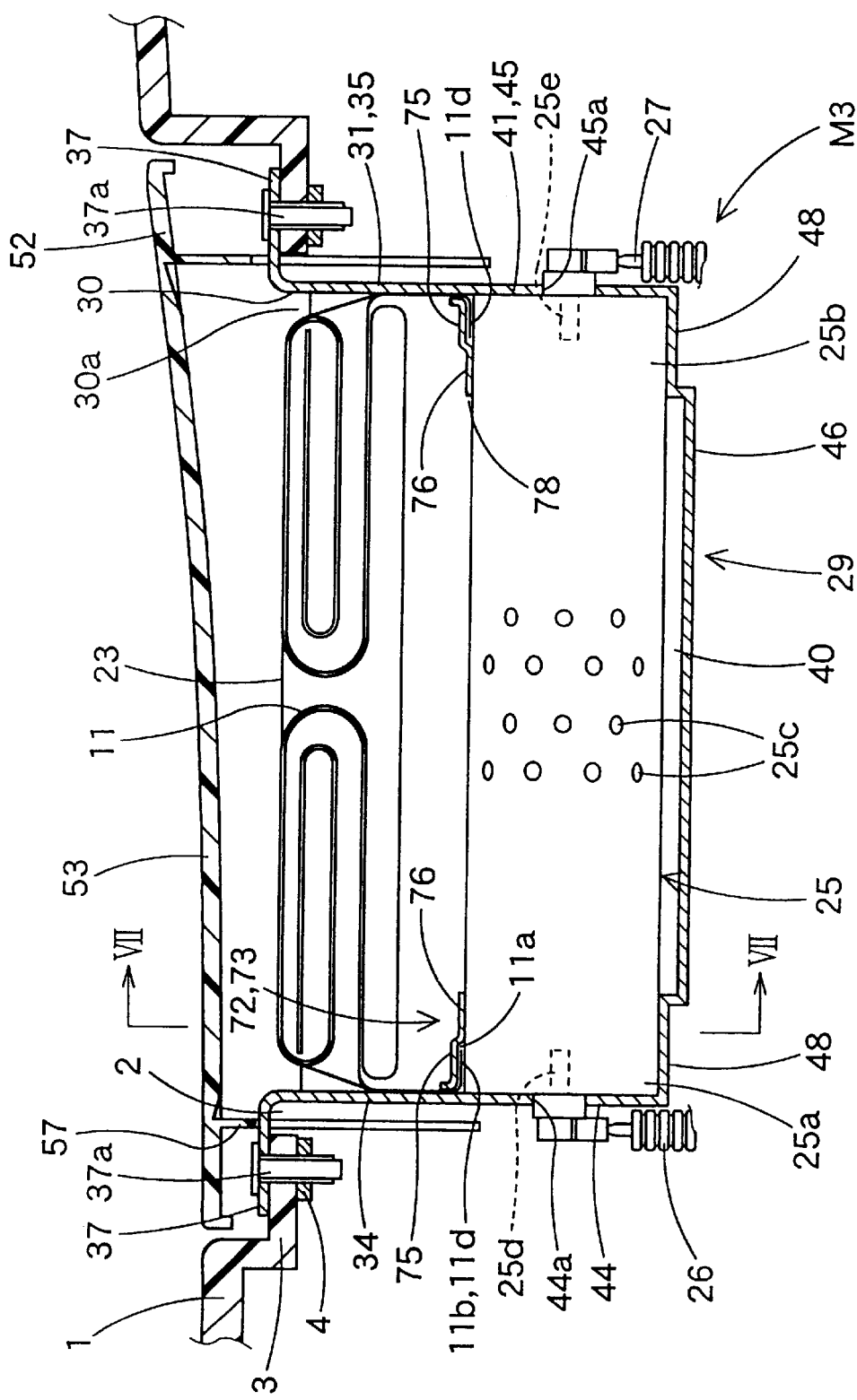
FIG. 8 is a cross sectional view showing the airbag device shown in FIG. 7 taken along the line VIII—VIII in FIG. 7.
Figure 9:
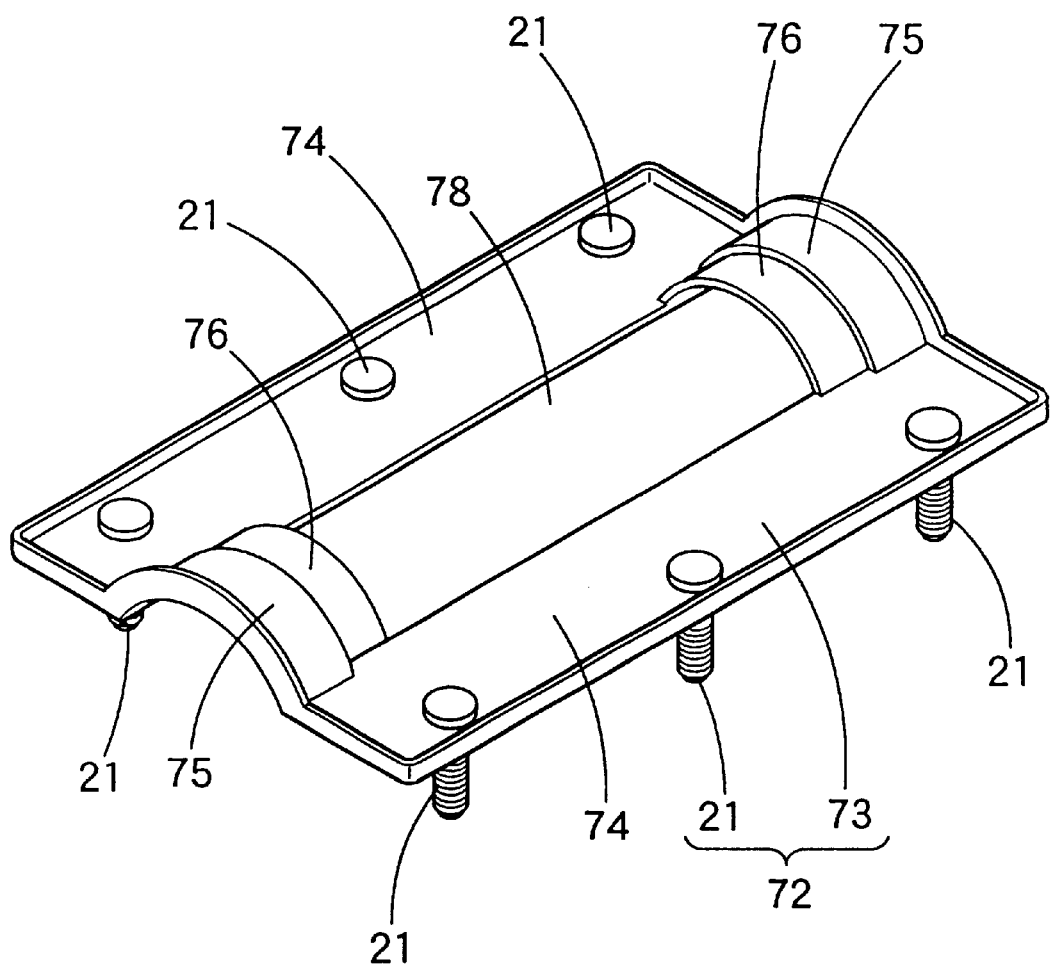
FIG. 9 is a perspective view showing a retainer of the third embodiment.

A third embodiment of the present invention is shown in FIGS. 7–9 and provides a retainer 72. The retainer 72 is preferably formed of sheet metal and includes a body portion 73. The body portion 73 comprises airbag presser portions 74, 75 and inflator presser portions 76. Each of the airbag presser portions 74 includes the plurality of bolts 21 affixed thereto and extending downwardly therefrom. Additionally, the inflator presser portions 76 are axially spaced (relative to the inflator 25) providing a gas communication hole 78 so that the retainer 72 does not interfere with expansion gas outflow from the gas discharge openings 25c.

As shown in FIG. 9, the airbag presser portions 75 extend between the airbag presser portions 74 and protrude upwardly therefrom in concavo-convex configuration. Inflator presser portions 76 are recessed downwardly (stepped down) from the airbag presser portions 75 and have similar concavo-convex configurations.

As shown in FIG. 7, the concavo-convex configuration of the inflator presser portions 76 provides generally downwardly facing concave surfaces, which conform to respective partial peripheries of the outer periphery of the inflator 25. As shown in FIG. 8, the stepped down configuration of the inflator presser portions 76 of the this embodiment, allows each presser portion 76 to engage the respective partial peripheries of the inflator 25, while the airbag presser portions 75 compress respective short sides 11d of the airbag 11 against the inflator 25.

The respective inflator presser portions 76 are preferably press worked into respective airbag presser portions 75. The respective inflator presser portions 76 are inwardly disposed relative to the airbag presser portions 75 so that the presser portions 76 substantially avoid contact with the short sides 1id of the airbag opening edge 11b. The respective inflator presser portions 76 are formed to be in the form of a semi-cylindrical members (e.g., having a concavo-convex configuration) so as to extend, in a circumferential direction, along respective upper portions of the ends 25a, 25b and engage partial peripheries thereof. As described above, the inflator presser portions 76 are recessed relative to the airbag presser portions 75 so that the airbag 11 may be securely retained between the presser portions 74 and mounts 38 (of the casing 29) and between the presser portions 75 and the outer periphery of the inflator 25, while the inflator presser portions 76 engage the respective partial peripheries of the inflator 25.

As shown in FIGS. 7–9, the inflator 25 is securely retained with the lower chamber 40 between the retainer 72 and the casing 29, without the use of bolts or other such fastening devices. Therefore, as with the airbag devices M1 and M2 of the first and second embodiments, the airbag device M2 comprises fewer constituent parts, is easier to install/remove, has an overall reduced weight, and is more cost-effective as compared with previous airbag devices in the art.

In the third embodiment, the inflator is supported at each axial end thereof via respective presser portions 76 (of the retainer 72) and supports 48 (of the casing 29). Shown in FIG. 7, each presser portion 76 engages a partial periphery of the outer periphery (of the inflator 25) that extends from a portion that is generally upwardly-forwardly facing to a portion that is generally upwardly-rearwardly facing. Consequently, the inflator is supported in the vertical and longitudinal directions (relative to the vehicle) by the presser portions 76 and supports 48, while it is supported axially by the laterally-spaced side walls 44a, 45a. Therefore, the inflator 25 is omnidirectionally stably held in the casing 29, as in the first and second described embodiments.

It is noted, that for any of the embodiments described above, the opening edge 11b (the short sides 1id) of the airbag 11 and the respective inflator presser portions (16B, 16F, 66B, 66F, and 76) may be extended axially inwardly (relative to the inflator 25), such that the inflator presser portions compress the opening peripheral edge 11b of the airbag 11 against the inflator 25.

Figure 10:
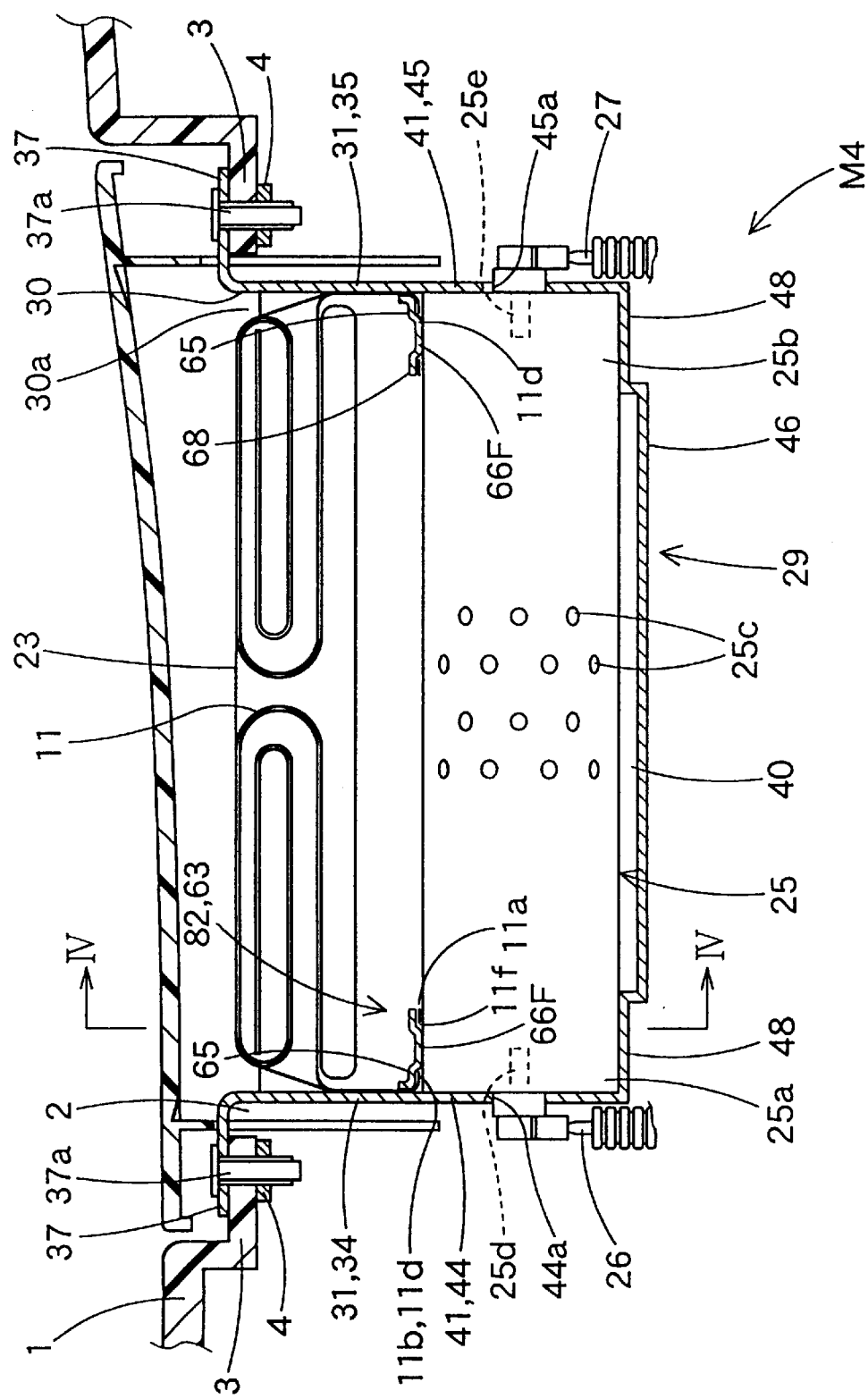
FIG. 10 is a cross sectional view showing a fourth embodiment of the airbag device of the present invention.
Figure 11:
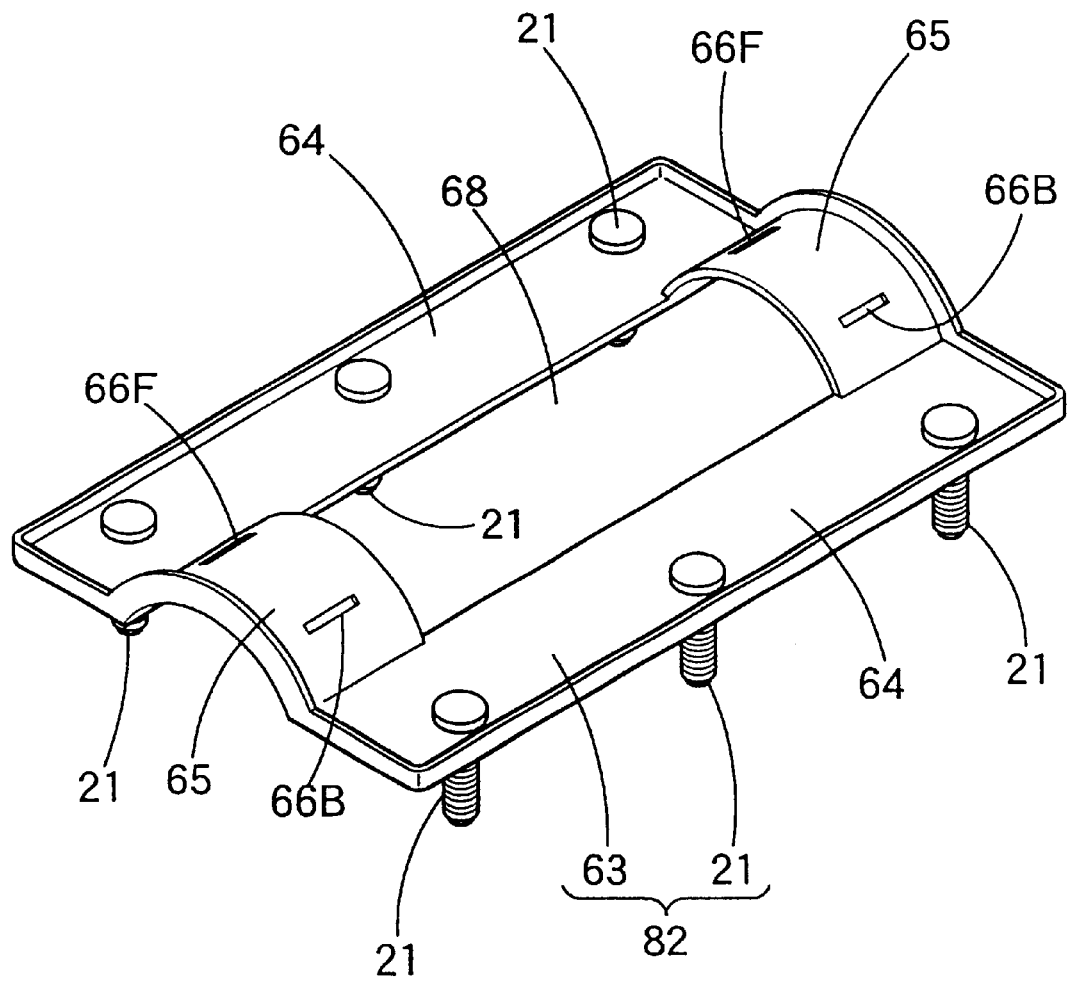
FIG. 11 is a perspective view showing the retainer of the fourth embodiment.

A fourth embodiment of the present invention comprises a retainer 82, as shown in FIGS. 10 and 11. It is noted that the retainer 82 is substantially similar to the embodiment of the retainer 62 shown in FIG. 6. As such, similar references are used to represent the various features thereof. In the fourth embodiment, the opening edge 11b (the short side 11d) of the airbag 11 provides latch holes 11f extending therethrough. Respective latch holes 11f are capable of receiving inflator presser portions 66B, 66F, such that the presser portions 66B, 66F extend through respective latch holes 11f and engage the inflator 25 at associated points. For this embodiment, the opening peripheral edge 11b is extended relatively farther inwardly, as compared to the first, second, and third embodiments. The respective presser portions 66B, 66F abut directly against the inflator 25 without compressing the airbag opening peripheral edge 11b, and secure the airbag opening peripheral edge 11b. Therefore, the presser portions 66B, 66F secure the opening peripheral edge 11b to enhance the strength of attachment of the opening peripheral edge 11b to the casing 29. It may be preferable for this embodiment for the inflator presser portions 66B, 66F to be spaced somewhat farther apart (circumferentially), relative to the presser portions 66B, 66F of the second embodiment While the principles of the invention have been made clear in the illustrative embodiments set forth above, it will be obvious to those skilled in the art to make various modifications to the structure, arrangement, proportion, elements, materials and components used in the practice of the invention.

It will thus be seen that the objects of this invention have been fully and effectively accomplished. It will be realized however, that the foregoing preferred specific embodiments have been shown and described for the purpose of illustrating the functional and structural principles of this invention and are subject to change without departure from such principles. Therefore, this invention includes all modifications encompassed within the spirit and scope of the following claims.

What is claimed is:

1. An airbag device comprising:
   an airbag provided with an opening for inflowing an expansion gas therethrough, the airbag capable of being folded,
   a cylindrical inflator capable of producing and supplying the expansion gas to the opening of the airbag, the inflator having opposite axial ends,
   a casing constructed and arranged to receive the folded airbag and the inflator therein, and
   a retainer adapted to engage a peripheral edge of the opening of the airbag and being mounted to the casing with the peripheral edge of the airbag being disposed and compressed between the retainer and the casing; wherein
      the retainer includes presser portions integrally formed therewith and positioned thereon proximate the opposite axial ends of the inflator to abut the inflator thereat when the retainer is mounted to the casing;
      the casing includes supports positioned corresponding to respective presser portions to abut the inflator proximate the opposite axial ends thereof; and
      the inflator is disposed between the presser portions of the retainer and the supports of the casing to secure the inflator therebetween within the casing.

2. The airbag device according to claim 1, wherein each axial end of the inflator is supported at a plurality of circumferentially-spaced points about an outer peripheral surface thereof, the circumferentially-spaced points being provided by respective presser portions and supports.

3. The airbag device according to claim 2, wherein the presser portions of the retainer are formed to provide elongated projections that abut the inflator.

4. The airbag device according to claim 2, wherein each axial end of the inflator is supported by at least one of the presser portions and at least one of the supports.

5. The airbag device according to claim 1, wherein the casing comprises an upper chamber, within which the folded airbag is disposed, and a lower chamber disposed below the upper chamber for receiving the inflator;
   wherein the casing is constructed and arranged such that the inflator is positionable within the lower chamber through the upper chamber.

6. The airbag device according to claim 1, wherein the presser portions of the retainer directly contact an exterior surface of the inflator.

7. The airbag device according to claim 1, wherein the retainer comprises airbag presser portions for compressing the peripheral edge of the opening of the airbag against an outer peripheral surface of the inflator, the presser portions being arranged adjacent the airbag presser portions to directly contact another surface of the inflator.

8. The airbag device according to claim 7, wherein the presser portions extend generally downwardly from the airbag presser portions.

9. An airbag device comprising:
   an airbag provided with an opening for inflowing an expansion gas therethrough, the airbag capable of being folded,
   a cylindrical inflator capable of producing and supplying the expansion gas to the opening of the airbag,
   a casing constructed and arranged to receive the folded airbag and the inflator therein, and
   a retainer adapted to engage a peripheral edge of the opening of the airbag and being mounted to the casing with the peripheral edge of the airbag being disposed and compressed between the retainer and the casing;
   the retainer including presser portions, which abut the inflator when mounted to the casing;
   the casing including supports, which abut the inflator;
   the inflator being disposed between the presser portions of the retainer and the supports of the casing, thereby securing the inflator within the casing;
   wherein each axial end of the inflator is supported at a plurality of circumferentially-spaced points about an outer peripheral surface thereof, the circumferentially-spaced points being provided by respective presser portions and supports;
   wherein the retainer includes a pair of presser portions at opposite ends thereof positioned thereon corresponding to the axial ends of the inflator, each pair of presser portions engaging a corresponding axial end of the inflator at two points thereof, and the casing providing supports at opposite ends thereof corresponding to each axial end of the inflator, each support engaging a corresponding axial end of the inflator at one point thereof.

10. An airbag device comprising:
    an airbag provided with an opening for inflowing an expansion gas therethrough, the airbag capable of being folded,
    a cylindrical inflator capable of producing and supplying the expansion gas to the opening of the airbag,
    a casing constructed and arranged to receive the folded airbag and the inflator therein, and
    a retainer adapted to engage a peripheral edge of the opening of the airbag and being mounted to the casing with the peripheral edge of the airbag being disposed and compressed between the retainer and the casing;
    the retainer including presser portions, which abut the inflator when mounted to the casing;
    the casing including supports, which abut the inflator;
    the inflator being disposed between the presser portions of the retainer and the supports of the casing, thereby securing the inflator within the casing;
    wherein the retainer comprises airbag presser portions for compressing the peripheral edge of the opening of the airbag against an exterior surface of the inflator, the presser portions being arranged adjacent the airbag presser portions to abut directly against the exterior surface of the inflator;

wherein the presser portions are positioned on the airbag presser portions, and the peripheral edge of the opening of the airbag is provided with holes, which permit corresponding presser portions to pass through the holes and directly contact the exterior surface of the inflator.

* * * * *